United States Patent [19]

Wood

[11] Patent Number: 4,765,139
[45] Date of Patent: Aug. 23, 1988

[54] THERMOCOUPLE FOR HEATING AND COOLING OF MEMORY METAL ACTUATORS

[75] Inventor: Charles Wood, Flintridge, Calif.

[73] Assignee: The United States of America as represented by the Administrator of the National Aeronautics and Space Administration, Washington, D.C.

[21] Appl. No.: 76,956

[22] Filed: Jul. 23, 1987

[51] Int. Cl.⁴ .............................................. F03G 7/06
[52] U.S. Cl. ...................................................... 60/527
[58] Field of Search .................. 60/527, 528, 529, 530, 60/531; 337/139, 140

[56] References Cited

U.S. PATENT DOCUMENTS

| | | | |
|---|---|---|---|
| 2,989,281 | 6/1961 | Fritts | 60/529 X |
| 3,194,010 | 7/1965 | Lejon | 60/531 |
| 3,652,969 | 3/1972 | Willson et al. | |
| 3,676,815 | 7/1972 | Du Rocher | |
| 3,849,756 | 11/1974 | Hickling | |
| 4,205,293 | 5/1980 | Melton et al. | |
| 4,520,336 | 5/1985 | Hastings et al. | |
| 4,544,988 | 10/1985 | Hockstein | |
| 4,551,974 | 11/1985 | Yaeger et al. | |
| 4,553,393 | 11/1985 | Ruoff | 60/527 X |
| 4,556,934 | 12/1985 | Lemme et al. | |

FOREIGN PATENT DOCUMENTS 219478 2/1985 Japan ..................................... 60/527

Primary Examiner—Allen M. Ostrager
Attorney, Agent, or Firm—Paul F. McCaul; John R. Manning; Thomas H. Jones

[57] ABSTRACT

A semiconductor thermocouple unit is provided for improving heating and cooling of memory metal actuators. The semiconductor thermocouple unit is mounted adjacent to a memory metal actuator and has a heat sink connected thereto. A flexible thermally conductive element extends between the semiconductor thermocouple and the actuator and serves as a heat transfer medium during heating and cooling operations.

15 Claims, 2 Drawing Sheets

THERMOCOUPLE FOR HEATING AND COOLING OF MEMORY METAL ACTUATORS

BACKGROUND OF THE INVENTION

1. Origin of the Invention

The invention described herein was made in the performance of work under a NASA contract, and is subject to the provisions of Public Law 96-517 (35 USC 202) in which the Contractor has elected not to retain title.

2. Field of the Invention

The present invention relates to memory metal actuators, and more specifically, to thermocouples for rapidly heating and cooling memory metal actuators.

3. Description of the Prior Art

Memory metal actuators formed of alloys such as Nitinol have been known for many years. Memory metal actuators are manufactured by forming such alloys into one shape while hot and another while cold. When a sufficient amount of heat is applied to the actuators to raise their temperature above the critical temperature of the alloy from which they are formed, the actuators snap from their cold shape to their hot shape. When the heat is removed, the actuators return to their cold shape.

In the past, heating of memory metal actuators has been performed by many methods, including direct application of current and heat conduction from a heat source via metal wires or metal thermocouples. The heating times attained by the direct application of current have been adequate for most purposes, and have not generally been matched by other methods of heating.

In contrast, the cooling times of memory metal actuators have not been quite as impressive. Common methods of cooling memory metal actuators have included placement and operation of actuators in cool environments such that convection is a continuously ongoing process, and by conduction of heat from the actuators to heat sinks via metal wires or metal thermocouples (see U.S Pat. No. 4,553,393 to Ruoff).

In many instances, it is desirable to increase the heating and/or cooling rate of memory metal actuators. It is especially desirable to increase the cooling rate of actuators in applications such as robotics in which actuators may be continuously cycled between their hot and cold shapes. In such applications, a disproportionate amount of each cycling period has conventionally been attributable to the cooling function.

SUMMARY OF THE INVENTION

The present invention is directed to an apparatus for improving the heating and cooling rates of memory metal actuators. The present invention includes a high efficiency semiconductor thermoelectric generator which may be mounted in proximity to the memory metal actuators. A flexible thermally conductive element extends between the semiconductor theremoelectric generator and the actuator and functions as a heat transmission medium. When a power supply is activated to supply DC current of a first polarity to the semiconductor thermoelectric generator, heat is generated which may be supplied to the actuators via the thermally conductive element. When cooling is desired, the polarity of the DC current may be reversed, biasing the thermally conductive element to draw heat from the actuator to a heat sink in contact with the semiconductor thermoelectric generator. The thermally conductive element flexes to accomodate changes in shape of the actuator.

DESCRIPTION OF THE PREFERRED EMBODIMENT

The following description is of the best presently contemplated mode of carrying out the present invention. This description is made for the purposes of illustrating the general principles of the invention and is not to be taken in a limiting sense. The scope of the invention is best determined by reference to the appended claims.

The present invention is directed to increasing the rate of cycling, and especially the rate of cooling, of memory metal actuators. This is accomplished by placing a high thermal efficiency semiconductor thermocouple unit in contact with a memory metal actuator. By applying a DC current of a selected polarity to the semiconductor thermocouple unit, selective high efficiency heating or cooling of the actuator may be attained.

Figure 1:
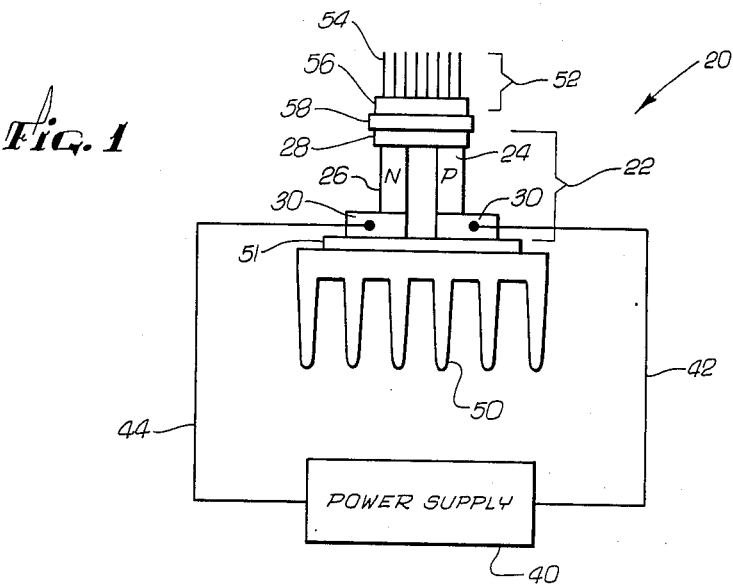
FIG. 1 illustrates the semiconductor thermocouple unit of the present invention.

FIG. 1 illustrates a semiconductor thermocouple unit 20 of the present invention which includes a semiconductor thermoelectric generator 22. The semiconductor thermoelectric generator 22 includes a P-type conductivity leg 24 and an N-type conductivity leg 26. The P-type leg 24 may be preferably formed of bismuth antimony telluride, and the N-type leg 26 may be preferably formed of bismuth tellurium selenide. Alternately, both the P-type and the N-type legs may be formed of the same material, such as lead telluride, germanium silicon alloys, bismuth telluride, or bismuth selenide, although other commonly known materials may be used. The top portions of both the P-type and N-type legs are electrically interconnected by a layer 28 formed of a conductive material such as copper. The bottom portion of the P-type and the N-type legs are electrically isolated from one another and are connected to electrical contacts 30.

When the opposing terminals of a power supply 40 are connected to the respective contacts 30 of the P-type leg 24 and the N-type leg 26 of the semiconductor thermoelectric generator 22 via wires 42 and 44 and DC current is delivered to the contacts, the semiconductor thermoelectric generator 22 operates as a thermocouple having a thermal efficiency of 100 to 1,000 or more times the thermal efficiency of conventional metal thermocouples. With appropriate adaptations, the semiconductor thermoelectric generator 22 may operate to very efficiently heat and/or cool memory metal actuators.

In order for the semiconductor thermoelectric generator 22 to operate well as a cooling apparatus for memory metal actuators, a heat sink 50 is provided. The finned metal heat sink 50 illustrated in FIG. 1 may be directly attached to an insulative layer 51 formed on the semiconductor thermoelectric generator 22. Alternate types of heat sinks such a liquid cooled heat sinks may be provided, and may also be placed in direct contact with the insulation layer 51 located on the semiconductor thermoelectric generator 22. As with heat sink 50, attachment of the alternate heat sinks to the insulative layer is not necessary.

The material from which the semiconductor thermoelectric generator 22 of FIG. 1 is made is typically is not very flexible. Since memory metal actuators change shape depending upon their temperature, some form of accomodation must be provided to allow the semiconductor thermoelectric generator 22 to remain in constant thermal contact with the actuators at temperatures both above and below the transition temperature of the actuators without flexing the semiconductor thermoelectric generator 22. In the present invention, this is accomplished by providing a compressible or flexible thermally conductive member 52, such as a wire brush, which extends from the semiconductor thermoelectric generator 22. The thermally conductive member 52 should have a high thermal conductivity, allowing heat to travel to the actuator or to the semiconductor thermoelectric generator 22, depending upon whether the semiconductor thermocouple unit is used to heat or cool an actuator. For example, if the thermally conductive element 52 is formed of a wire brush, the brush fibers 54 may be formed of tungsten, molybdenum, niobium, copper, nickel, silver, gold, aluminum or graphite fibers. The wire fibers 54 may emanate from a thermally conductive copper layer 56 located adjacent to a thermally conductive but electrically insulative layer 58 formed on the semiconductor thermoelectric generator 22. The thermally conductive electrically insulative layer 58 may be formed, for example, of a material such as beryllium oxide or aluminum oxide (alumina), as may be the insulative layer 51 which separates the semiconductor thermoelectric generator 22 from the heat sink 50.

Figure 2A:
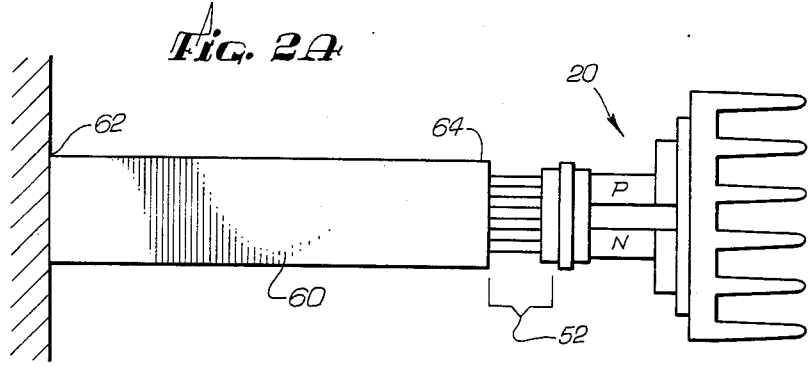
FIGS. 2A and 2B illustrate the semiconductor thermocouple unit of FIG. 1 in its operable position adjacent to a linear memory metal actuator.
Figure 2B:
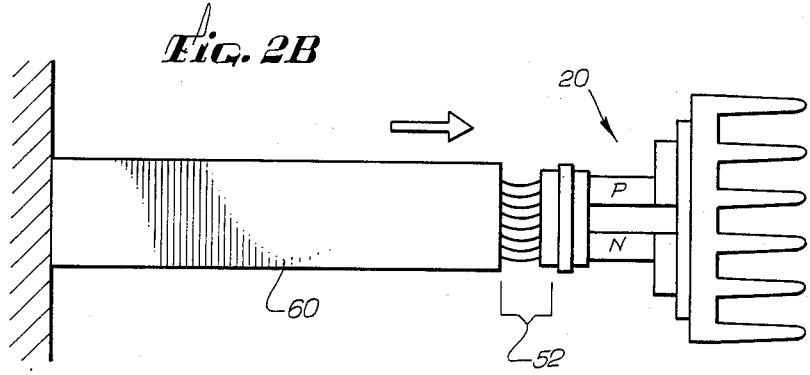

FIG. 2A illustrates the semiconductor thermocouple unit 20 of FIG. 1 in its operable position adjacent to a memory metal actuator 60. The memory metal actuator 60 illustrated deforms at its transition temperature and is fixed at its first end 62. The semiconductor thermocouple unit 20 is positioned with the flexible thermally conductive element 52 located adjacent to the opposite end 64 of the actuator 60. Thus, when the actuator 60 expands linearly, as illustrated in FIG. 2B, the thermally conductive element 52 is flexed but remains in constant contact with the actuator 60. In this manner, thermal conduction is maintained between the actuator 60 and the semiconductor thermocouple unit 20 during shape transitions, preventing the flexing and possible destruction of the semiconductor thermoelectric generator 22.

If the thermally conductive element 52 is formed of a wire brush, the semiconductor thermocouple unit 20 should preferably be mounted such that the wires 54 are slightly flexed when the actuator 60 is in its furthest position from the semiconductor thermocouple unit 20. The wires 54 will therefore easily bend further when the distance between the semiconductor thermoelectric generator 22 and the actuator 60 decreases. The length of the wires should preferably be minimized in order to maximize thermal transfer and hence the thermal efficiency of the entire semiconductor thermocouple unit 20. However, the length of the wires 54 should be sufficient to accomodate the displacement of the actuator 60 during shape changes.

Figure 3A:
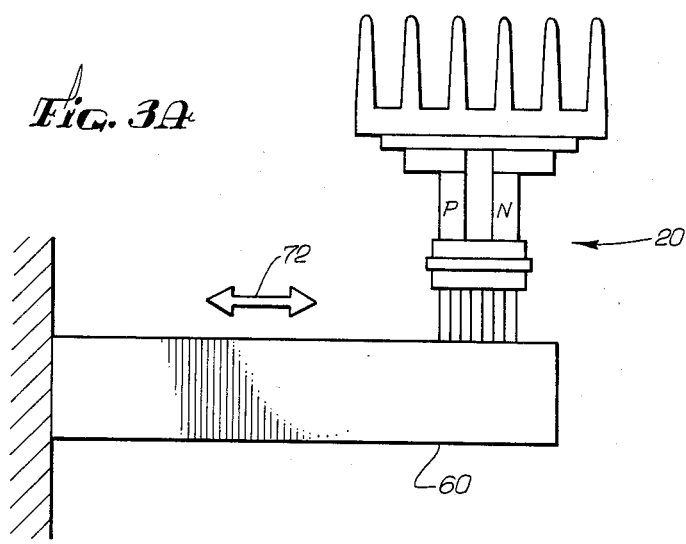
FIGS. 3A and 3B illustrate the semiconductor thermocouple unit of FIG. 1 in its operable position normal to the direction of deformation of memory metal actuators.
Figure 3B:
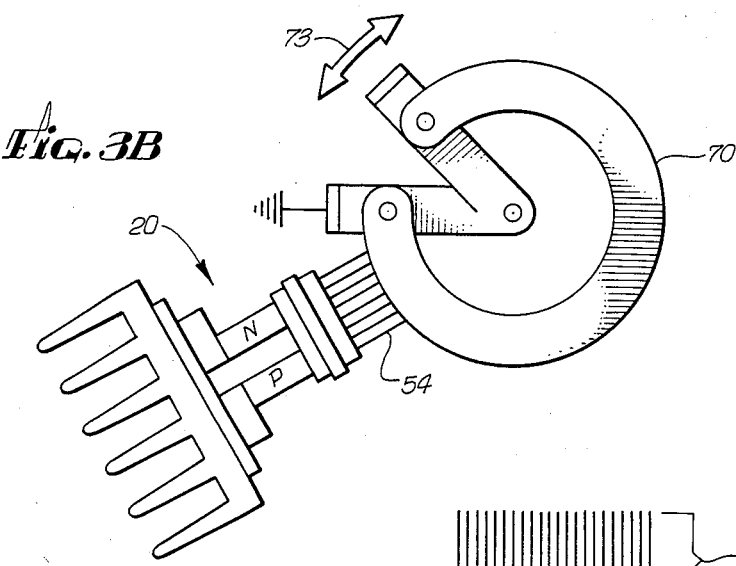

In cases where there is considerable motion of the actuator 60, longer wires may be required for adequate flexibility. This, however, may considerably hamper thermal conduction between the actuator and the semiconductor thermoelectric generator 22. It may therefore be desirable to mount the semiconductor thermocouple unit 20 adjacent to a fixed end of the actuator 60 where the deflection of the actuator 60 is likely to be of a lesser magnitude during shape transitions. Wires of a smaller length may then be utilized. The wires 54 may also be mounted normal to the plane of motion of the actuator, as illustrated in FIG. 3A for the actuator 60, and as illustrated in FIG. 3B for a rotary actuator 70. In FIGS. 3A and 3B, the wires 54 contact the sides of the actuators as the actuators expand and contract in the direction of the arrows 72 and 73 rather than directly opposing the motion of the actuators.

Figure 4:
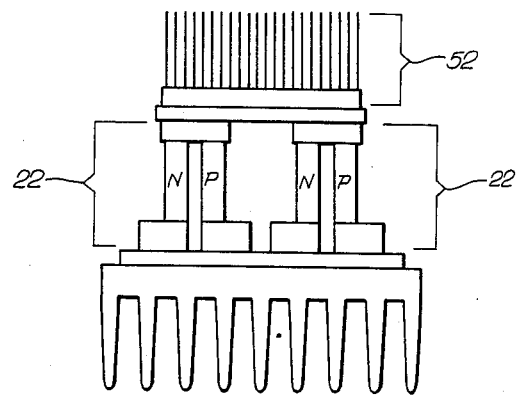
FIG. 4 illustrates an alternate embodiment of the semiconductor thermocouple of the present invention.

As illustrated in FIG. 4, it may also be possible to increase the heating and cooling rate of the semiconductor thermocouple unit by providing additional semiconductor thermoelectric generators 22. If additional generators 22 are added, it may be desirable to modify the thermally conductive element so that the resulting increased rate of thermal conduction may be accomodated. For example, as illustrated in FIG. 4, additional metal wires may be provided for transmitting heat to and from an actuator.

The semiconductor thermocouple unit 20 described may be utilized in many manners. For example, the semiconductor thermocouple unit 20 described may be used as the sole means for heating and/or cooling a metal memory actuator by varying the polarity of the DC current applied over time. The semiconductor thermocouple unit 20 may also be used to supplement other methods of heating and/or cooling. For example, if the preferred method of heating a metal memory actuator is by the direct application of current, a semiconductor thermocouple unit 20 may be utilized as a cooling means. When current is being applied directly to the actuator during the heating stage, the semiconductor thermocouple unit 20 may also be activated to transmit heat to the actuator, supplementing the current induced heat. In other applications, a first semiconductor thermocouple unit may be used to heat a first portion of an actuator and a second semiconductor thermocouple unit may be used to cool a second portion of the actuator. In such cases, one semiconductor thermocouple unit may be placed adjacent to each of the portions of the actuator, and current of opposite polarity may be applied to the thermocouple units, heating one portion of the actuator and cooling the other.

We claim:

1. An apparatus for cooling a memory metal actuator, comprising:

a semiconductor thermocouple including a first portion having an N-type conductivity, a second portion having a P-type conductivity, and a third electrically conductive portion electrically connecting the first portion and the second portion;

a flexible thermally conductive element extending between the semiconductor thermocouple and the memory metal actuator for transmitting heat therebetween; and a power supply for supplying DC current through the first, second, and third portions to activate the semiconductor thermocouple.

2. An apparatus according to claim 1, wherein the flexible thermally conductive element comprises a plurality of bendable metal wires attached to a common thermally conductive layer.

3. An apparatus according to claim 1, further comprising a heat sink connected to the semiconductor thermocouple, wherein the power supply supplies DC current to the semiconductor thermocouple, activating the thermocouple to draw heat through the flexible thermally conductive element which is passed to the heat sink.

4. An apparatus according to claim 3, wherein the heat sink comprises a finned metal structure cooled by convection.

5. An apparatus according to claim 3, wherein the heat sink is cooled by liquid flow.

6. An apparatus according to claim 1, wherein the first portion having N-type conductivity is formed of a member selected form the group consisting of bismuth tellurium selenide, lead telluride, bismuth telluride, bismuth selenide and an alloy of germanium silicon.

7. An apparatus according to claim 1, wherein the second portion having P-type conductivity is formed of a member selected from the group consisting of bismuth antimony telluride, lead telluride, bismuth telluride, bismuth selenide and an alloy of germanium silicon.

8. An apparatus according to claim 1, wherein the first portion of N-type conductivity has the same composition as the second portion of P-type conductivity.

9. An apparatus according to claim 2, wherein the metal wire is composed of a member selected from the group consisting of tungsten, molybdenum, niobium, copper, nickel, silver, gold, aluminum and graphite.

10. An apparatus according to claim 1, further comprising a thermally conductive electrically insulative layer formed between the semiconductive thermocouple and the flexible thermally conductive element.

11. An apparatus according to claim 11, wherein said insulative layer is composed of a member selected from the group consisting of beryllium oxide and aluminum oxide.

12. An apparatus according to claim 3, further comprising an insulative layer formed between the semiconductive thermocouple and the heat sink.

13. An apparatus according to claim 12, wherein said insulative member is composed of a member selected from the group consisting of beryllium oxide and aluminum oxide.

14. A heat transmission apparatus for a memory metal actuator having a first shape at temperatures above a transition temperature and a second shape at temperatures below the transition temperature, the apparatus comprising:

a semiconductor thermocouple;

a flexible heat transmission element located between the semiconductor thermocouple and the memory metal actuator for transmitting heat therebetween, the compressible heat transmission element flexing to remain in continuous contact with both the semiconductor thermocouple and the memory metal actuator at temperatures of the memory metal actuator both above and below the transition temperature.

15. A heat transmission apparatus according to claim 14, further comprising:

a heat sink attached to the semiconductor thermocouple;

a power supply for passing a DC current of a first and second polarity through the semiconductor thermocouple, wherein the semiconductor thermocouple generates heat which is passed through the flexible heat transmission element to the actuator when the power supply passes a current of the first polarity to the semiconductor thermocouple, and the semiconductor thermocouple draws heat from the actuator which is passed to the heat sink when the power supply passes a current of the second polarity to the semiconductor thermocouple.

* * * * *